Feb. 1, 1927.
C. A. BRUST, JR
1,616,024
FISHING TOOL
Filed April 19, 1926
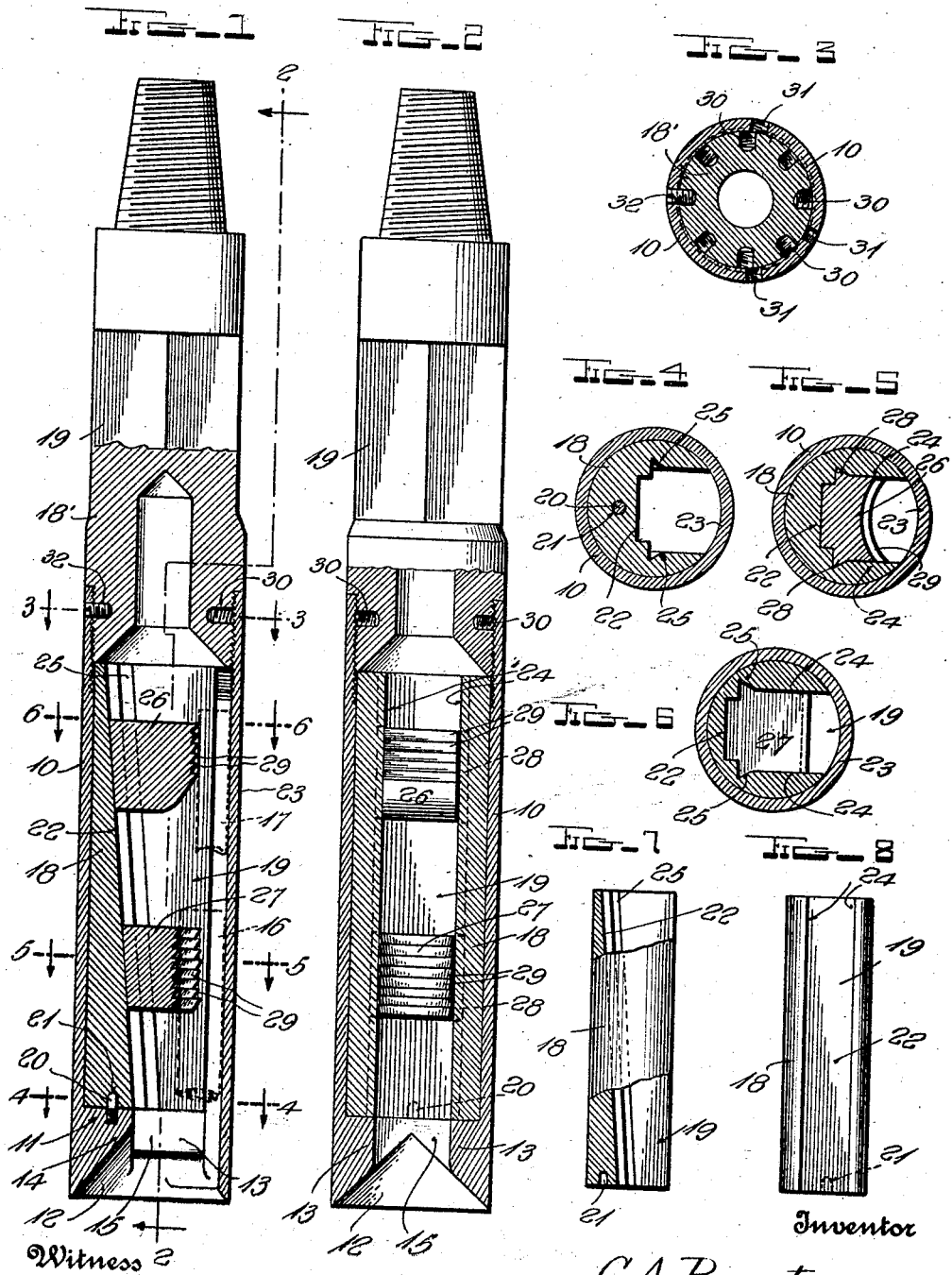

Patented Feb. 1, 1927.

1,616,024

UNITED STATES PATENT OFFICE.

CHARLES A. BRUST, JR., OF EL DORADO, ARKANSAS.

FISHING TOOL.

Application filed April 19, 1926. Serial No. 103,062.

The invention relates to improvements in tools for fishing broken rods and tubes out of wells, and it is the object of such invention to provide an exceptionally simple and inexpensive fishing tool, yet one which will possess points of great superiority over analogous tools heretofore devised, the principal advantages being that the slip-guiding means cannot be sprung out of place, and the tool may readily be disassembled to permit the insertion of a new slip or slips whenever necessary.

With the foregoing in view, the invention resides in the novel subject matter hereinafter described and claimed, the description being supplemented by the accompanying drawing.

Figure 1 is a vertical longitudinal section thru a fishing tool constructed in accordance with my invention.

Fig. 2 is an additional vertical section, partly in elevation, as indicated by line 2—2 of Fig. 1.

Figs. 3, 4, 5 and 6 are horizontal sections as indicated by the correspondingly numbered lines of Fig. 1.

Fig. 7 is a side elevation partly in section of the slip-guiding body.

Fig. 8 is a side elevation of the body shown in Fig. 7, looking in a different direction.

In the drawing above briefly described, 10 designates a one-piece vertically elongated cylindrical casing which is open at its upper end, is formed near its lower end with an internal, upwardly facing ledge 11, and is flared at 12 beneath said ledge. This ledge when view from above, is substantially U-shaped with its opposed side portions 13 of less horizontal width than its intermediate portion 14, said side portions 13 extending to the portion of the casing wall, opposite the inner portion 14 of the ledge, so that these parts jointly form an eccentrically positioned opening 15 to receive the upper end of a tube 16 or a rod 17, fragments of a tube and rod being shown in dotted lines in Fig. 1.

A one-piece, cylindrical, slip-guiding body 18 is received snugly in the casing 10 and rests upon the ledge 11, said body being held in place by the lower end of a "substitute" or coupling body 18', which is threaded into and abuts the upper end of said body 18. The body 18 is formed with a longitudinal channel 19 which opens through its exterior and through its ends, said channel communicating with the opening 15, so as to receive a rod or a tube as the case may be, and in order to hold said body against rotation in the casing 10, which rotation would disalign the channel 19 and the opening 15, I provide an upstanding stud 20 on the ledge 11, and a socket 21 in the lower end of the body 18, said socket tightly receiving said stud, but permitting upward movement of said body 18 from the casing 10 whenever necessary.

The inner wall 22 of the channel 19, is preferably flat, and this wall is disposed in upwardly diverging relation with the portion 23 of the casing 10, which portion closes the open side of said channel. The opposed side walls 24 of this channel are also preferably flat, and they are provided with longitudinal grooves 25 adjacent to and parallel with the inner wall 22, said grooves being preferably of the angular shape shown in Figs. 4, 5 and 6.

Upper and lower slips 26 and 27 are slidably received in the channel 19 and they contact snugly with the inner wall 22 and the side walls 24 of said channel, said slips being formed with integral ribs 28 which are slidably received in the grooves 25, so as to prevent movement of said slips away from the inner wall 22 of the channel. Both of these slips are provided with teeth 29 which face the casing portion 23 and are cooperable with said casing portion to grip a rod, tube or the like, as indicated by dotted lines in Fig. 1, and these slips preferably possess the size relation herein disclosed, so that small rods or other members may be gripped by the upper slip 26, whereas larger members may be gripped by the lower slip 27. Normally, when the device is being lowered into a well, the ribs 28 of the lower slip rest upon the side portions 13 of the ledge 11, which portions close the lower ends of the groove 25, and thus said slip is held against dropping out of place. Then, the upper slip 26 rests upon the lower slip and both of them are in readiness to rise to the necessary extent when engaged by a rod, tube or the like entering through the opening 15, so that one or the other of the slips may eventually drop by gravity into gripping relation with said rod, tube or the like, and it will be seen that as soon as an upward pull is placed upon the device, the slip which has engaged itself with the rod, tube or other element, will be wedged more tightly into engagement with it, due to the inclination of the inner channel wall 22, the ribs 28 being then practically free from strain, so that there is no tendency to transversely expand the slip-guiding member 18. Thus, the improved fishing tool will retain its proper shape after repeated use under the most trying conditions, which cannot be said of most tools heretofore in use, as they soon become so badly distorted and very often broken, as to be useless.

In addition to the advantage of being free from distortion, as above explained, attention is invited to the fact that by disconnecting the "substitute" from the casing 10, the slip-guiding body 18 and the slips may readily be removed from said casing, so that the teeth of said slips may be reground with ease, or new slips substituted. The device also possesses the advantage of being easy to manufacture without numerous specially constructed tools or machines and hence the cost of production is cut down to the minimum. On account of such advantages as these, the details disclosed are preferably followed. However, within the scope of the invention as claimed, variations may be made.

Preferably used in connection with the features above described, is a novel means for locking the "substitute" 18' against accidental unthreading from the casing 10. To accomplish this end, I form the casing-encircled portion of the "substitute" with a plurality of radial, threaded sockets 30 which are rather closely spaced and have their axes spaced uniform distances from each other. In the upper end of the casing 10 however, I form a fewer number of threaded openings 31 which are so related with the sockets 30 that only one opening and one socket will register at one time, but another opening may be brought into register with another socket, by giving the parts 10 and 18' a very slight relative turn. Thus, when the member 18' is threaded into the casing 10 to the maximum, it is assured that at least one of the openings shall be in register with one of the sockets 30, so that a locking screw 32 may be inserted as shown in Figs. 1 and 3.

I claim:

1. A fishing tool comprising a cylindrical casing open at its upper and lower ends, internally flared at said lower end, and having an abrupt internal upwardly facing ledge near said lower end above the flare, a cylindrical slip-guiding body snugly received in said casing and resting on said ledge, said body having a longitudinal channel which opens through its exterior and through its lower end and has its open side closed throughout its length by a portion of said casing; the inner wall of said channel being disposed in upwardly diverging relation with said channel-closing portion of the casing, the opposed side walls of said channel having longitudinal grooves parallel with said inner wall, a slip slidable in said channel and having teeth facing and cooperating with said channel-closing casing portion to perform a gripping function, said slip contacting slidably with said inner wall of the channel and having ribs slidably received in said grooves, a coupling body having a threaded connection with the upper end of said casing and abutting the upper end of said slip-guiding body to secure it in place, and means for holding said slip-guiding body against rotation within the casing.

2. A structure as specified in claim 1; said means for holding said slip-guiding body against rotation, consisting of a stud rising from said ledge and a socket in said body receiving said stud.

3. A fishing tool comprising a one-piece cylindrical casing, open at its upper and lower ends, internally flared at said lower end and having an abrupt internal upwardly facing ledge near said lower end above the flare, a one-piece cylindrical slip-guiding body snugly received in said casing and resting on said ledge, said body having a longitudinal channel which opens through its exterior and through its upper and lower ends and has its open side closed throughout its length by a portion of said casing; the inner wall of said channel being disposed in upwardly diverging relation with said channel-closing casing portion, the opposed side walls of said channel being formed with longitudinal grooves parallel with said inner wall and closed at their lower ends by the aforesaid ledge, a slip slidable in said channel and having teeth facing and cooperating with said channel-closing casing portion to perform a gripping function, said slip contacting slidably with said inner wall of the channel and having ribs slidably received in said grooves, a coupling body having a threaded connection with the upper end of said casing and abutting the upper end of said slip-guiding body to secure it in place, and means for holding said slip-guiding body against rotation within the casing.

4. In a fishing tool, outer and inner members threaded together, the inner member being comparatively thick and having an annular series of closely and uniformly spaced radial sockets arranged around the circumference thereof while the outer member is formed with comparatively few differently and widely spaced peripherally arranged openings, one of said openings being adapted to register with one of the sockets when the two members are turned slightly and when turned to tightly connected position, and a locking screw insertible into the registering opening and socket.

In testimony whereof I have hereunto affixed my signature.

CHARLES A. BRUST, Jr.